(12) United States Patent
Gebreselassie et al.

(10) Patent No.: US 7,641,927 B2
(45) Date of Patent: Jan. 5, 2010

(54) CHEWING GUM AND CONFECTIONERY COMPOSITIONS CONTAINING A STAIN REMOVING COMPLEX, AND METHODS OF MAKING AND USING THE SAME

(75) Inventors: Petros Gebreselassie, Piscataway, NJ (US); Shiuh John Luo, Livingston, NJ (US); Navroz Boghani, Wharton, NJ (US)

(73) Assignee: Cadbury Adams USA, LLC, Wilmington, DE (US)

( * ) Notice: Subject to any disclaimer, the term of this patent is extended or adjusted under 35 U.S.C. 154(b) by 378 days.

(21) Appl. No.: 11/602,851

(22) Filed: Nov. 21, 2006

(65) Prior Publication Data

US 2007/0077210 A1    Apr. 5, 2007

(51) Int. Cl.
    A23G 4/06    (2006.01)
    A61K 9/68    (2006.01)
(52) U.S. Cl. .................. 426/3; 424/48; 424/440; 426/2; 426/5; 514/58
(58) Field of Classification Search ................ None
    See application file for complete search history.

(56) References Cited

U.S. PATENT DOCUMENTS

| | | |
|---|---|---|
| 1,633,336 A | 6/1927 | Larson |
| 1,936,456 A | 11/1933 | Larson |
| 2,191,199 A | 2/1940 | Hall |
| 2,197,719 A | 4/1940 | Connor |
| 2,876,167 A | 3/1959 | Manahan |
| 2,886,446 A | 5/1959 | Kramer et al. |
| 3,004,897 A | 10/1961 | Shore |
| 3,052,552 A | 9/1962 | Koerner et al. |
| 3,117,027 A | 1/1964 | Lindlof et al. |
| 3,124,459 A | 3/1964 | Erwin |
| 3,241,520 A | 3/1966 | Wurster et al. |
| 3,475,533 A | 10/1969 | Mayrand |
| 3,538,230 A | 11/1970 | Pader et al. |
| 3,664,962 A | 5/1972 | Kelly et al. |
| 3,664,963 A | 5/1972 | Pasin |
| 3,677,771 A | 7/1972 | Kolar |
| 3,795,744 A | 3/1974 | Ogawa et al. |

(Continued)

FOREIGN PATENT DOCUMENTS

CN    98113552.8    10/1998

(Continued)

OTHER PUBLICATIONS

Prencipe et al.; Squeezing out a better toothpaste; Chemtech, Dec. 1995; http://pubs.acs.org/hotartcl/chemtech/95/dec/dec.html; printed Apr. 20, 2004; pp. 1-7.

(Continued)

Primary Examiner—Jennifer McNeil
Assistant Examiner—Hong Mehta
(74) Attorney, Agent, or Firm—Watov & Kipnes, P.C.

(57) ABSTRACT

A composition in the form of a chewing gum composition or a confectionery composition containing a stain removing complex of a stain removing agent and a cyclodextrin compound and methods of preparing and using the same to remove stains from dental material including teeth.

15 Claims, 1 Drawing Sheet

U.S. PATENT DOCUMENTS

| | | |
|---|---|---|
| 3,821,417 A | 6/1974 | Westall et al. |
| 3,826,847 A | 7/1974 | Ogawa et al. |
| 3,857,964 A | 12/1974 | Yolles |
| 3,862,307 A | 1/1975 | DiGiulio |
| 3,872,021 A | 3/1975 | McKnight |
| 3,878,938 A | 4/1975 | Venables et al. |
| 3,912,817 A | 10/1975 | Sapsowitz |
| 3,943,258 A | 3/1976 | Bahoshy et al. |
| 3,962,416 A | 6/1976 | Katzen |
| 4,037,000 A | 7/1977 | Burge et al. |
| 4,083,995 A | 4/1978 | Mitchell et al. |
| 4,107,360 A | 8/1978 | Schmidgall |
| 4,130,638 A | 12/1978 | Dhabhar et al. |
| 4,148,872 A | 4/1979 | Wagenknecht et al. |
| 4,150,112 A | 4/1979 | Wagenknecht et al. |
| 4,156,715 A | 5/1979 | Wagenknecht et al. |
| 4,156,716 A | 5/1979 | Wagenknecht et al. |
| 4,157,385 A | 6/1979 | Wagenknecht et al. |
| 4,159,315 A | 6/1979 | Wagenknecht et al. |
| 4,160,054 A | 7/1979 | Wagenknecht et al. |
| 4,160,820 A | 7/1979 | Wagenknecht et al. |
| 4,208,431 A | 6/1980 | Friello et al. |
| 4,217,368 A | 8/1980 | Witzel et al. |
| 4,224,345 A | 9/1980 | Tezuka et al. |
| 4,267,166 A * | 5/1981 | Yajima .................. 424/48 |
| 4,271,199 A | 6/1981 | Cherukuri et al. |
| 4,295,845 A | 10/1981 | Sepulveda et al. |
| 4,314,990 A | 2/1982 | Denny, Jr. et al. |
| 4,340,583 A | 7/1982 | Wason |
| 4,352,825 A | 10/1982 | Cherukuri et al. |
| 4,363,756 A | 12/1982 | Sepulveda et al. |
| 4,367,219 A | 1/1983 | Schole |
| 4,384,004 A | 5/1983 | Cea et al. |
| 4,452,821 A | 6/1984 | Gergely |
| 4,457,857 A | 7/1984 | Sepulveda et al. |
| 4,485,118 A | 11/1984 | Carroll et al. |
| 4,513,012 A | 4/1985 | Carroll et al. |
| 4,585,649 A | 4/1986 | Lynch |
| 4,590,075 A | 5/1986 | Wei et al. |
| 4,597,970 A | 7/1986 | Sharma et al. |
| 4,614,649 A | 9/1986 | Gorman et al. |
| 4,673,577 A | 6/1987 | Patel |
| 4,722,845 A | 2/1988 | Cherukuri et al. |
| 4,726,953 A | 2/1988 | Carroll et al. |
| 4,740,376 A | 4/1988 | Yang |
| 4,749,575 A | 6/1988 | Rotman |
| 4,751,095 A | 6/1988 | Karl et al. |
| 4,752,481 A | 6/1988 | Dokuzovic |
| 4,753,790 A | 6/1988 | Silva et al. |
| 4,771,784 A | 9/1988 | Kozin et al. |
| 4,800,087 A | 1/1989 | Mehta |
| 4,804,548 A | 2/1989 | Sharma et al. |
| 4,816,265 A | 3/1989 | Cherukuri et al. |
| 4,822,599 A | 4/1989 | Mitra |
| 4,828,845 A | 5/1989 | Zamudio-Tena et al. |
| 4,828,857 A | 5/1989 | Sharma et al. |
| 4,842,762 A | 6/1989 | Sabol, Jr. et al. |
| 4,911,934 A | 3/1990 | Yang et al. |
| 4,915,958 A | 4/1990 | Faust et al. |
| 4,918,182 A | 4/1990 | Jackson et al. |
| 4,919,841 A | 4/1990 | Kamil et al. |
| 4,923,684 A | 5/1990 | Ibrahim et al. |
| 4,927,646 A | 5/1990 | Jenner et al. |
| 4,929,447 A | 5/1990 | Yang |
| 4,931,293 A | 6/1990 | Cherukuri et al. |
| 4,933,190 A | 6/1990 | Cherukuri et al. |
| 4,952,407 A | 8/1990 | Record et al. |
| 4,971,797 A | 11/1990 | Cherukuri et al. |
| 4,978,537 A | 12/1990 | Song |
| 4,985,236 A | 1/1991 | Ibrahim et al. |
| 4,997,659 A | 3/1991 | Yatka et al. |
| 5,009,900 A | 4/1991 | Levine et al. |
| 5,017,385 A | 5/1991 | Wienecke |
| 5,043,154 A | 8/1991 | Gaffar et al. |
| 5,043,169 A | 8/1991 | Cherukuri et al. |
| 5,057,327 A | 10/1991 | Yatka et al. |
| 5,057,328 A | 10/1991 | Cherukuri et al. |
| 5,059,429 A | 10/1991 | Cherukuri et al. |
| 5,064,658 A | 11/1991 | Cherukuri et al. |
| 5,073,389 A | 12/1991 | Wienecke |
| 5,080,877 A | 1/1992 | Chane-Ching et al. |
| 5,082,671 A | 1/1992 | Cherukuri et al. |
| 5,084,278 A | 1/1992 | Mehta |
| 5,096,699 A | 3/1992 | Gaffar et al. |
| 5,096,701 A | 3/1992 | White, Jr. et al. |
| 5,100,678 A | 3/1992 | Reed et al. |
| 5,108,763 A | 4/1992 | Chau et al. |
| 5,126,151 A | 6/1992 | Bodor et al. |
| 5,139,793 A | 8/1992 | Johnson et al. |
| 5,139,794 A | 8/1992 | Patel et al. |
| 5,139,798 A | 8/1992 | Yatka et al. |
| 5,154,939 A | 10/1992 | Broderick et al. |
| 5,164,210 A | 11/1992 | Campbell et al. |
| 5,169,657 A | 12/1992 | Yatka et al. |
| 5,169,658 A | 12/1992 | Yatka et al. |
| 5,174,514 A | 12/1992 | Prodi |
| 5,176,900 A | 1/1993 | White, Jr. et al. |
| 5,198,251 A | 3/1993 | Song et al. |
| 5,202,112 A | 4/1993 | Prencipe et al. |
| 5,208,009 A | 5/1993 | Gaffar et al. |
| 5,227,182 A | 7/1993 | Song et al. |
| 5,229,148 A | 7/1993 | Copper |
| 5,240,710 A | 8/1993 | Bar-Shalom et al. |
| 5,256,402 A | 10/1993 | Prencipe et al. |
| 5,273,741 A | 12/1993 | Gaftar et al. |
| 5,300,283 A | 4/1994 | Prencipe et al. |
| 5,334,375 A | 8/1994 | Nabi et al. |
| 5,336,509 A | 8/1994 | McGrew et al. |
| 5,352,439 A | 10/1994 | Norfleet et al. |
| 5,370,881 A | 12/1994 | Fuisz |
| 5,380,530 A | 1/1995 | Hill |
| 5,385,729 A | 1/1995 | Prencipe et al. |
| 5,391,315 A | 2/1995 | Ashkin |
| 5,413,799 A | 5/1995 | Song et al. |
| 5,415,880 A | 5/1995 | Song et al. |
| 5,437,876 A | 8/1995 | Synosky et al. |
| 5,462,754 A | 10/1995 | Synosky et al. |
| 5,498,378 A | 3/1996 | Tsaur et al. |
| 5,501,864 A | 3/1996 | Song et al. |
| 5,503,823 A | 4/1996 | Norfleet et al. |
| 5,505,933 A | 4/1996 | Norfleet et al. |
| 5,532,004 A | 7/1996 | Bell et al. |
| 5,582,816 A | 12/1996 | Mandanas et al. |
| 5,589,160 A | 12/1996 | Rice |
| 5,599,527 A | 2/1997 | Hsu et al. |
| 5,603,920 A | 2/1997 | Rice |
| 5,618,517 A | 4/1997 | Miskewitz |
| 5,629,035 A | 5/1997 | Miskewitz |
| 5,645,821 A | 7/1997 | Libin |
| 5,651,958 A | 7/1997 | Rice |
| 5,658,553 A | 8/1997 | Rice |
| 5,676,932 A | 10/1997 | Wason et al. |
| 5,698,215 A | 12/1997 | Kalili et al. |
| 5,702,687 A | 12/1997 | Miskewitz |
| 5,713,738 A | 2/1998 | Yarborough |
| 5,716,601 A | 2/1998 | Rice |
| 5,736,175 A | 4/1998 | Cea et al. |
| 5,756,074 A | 5/1998 | Ascione et al. |
| 5,789,002 A | 8/1998 | Duggan et al. |
| 5,800,848 A | 9/1998 | Yatka et al. |
| 5,824,291 A | 10/1998 | Howard |
| 5,869,028 A | 2/1999 | McGill et al. |
| 5,879,728 A | 3/1999 | Graff et al. |
| 5,912,007 A | 6/1999 | Pan et al. |

| | | | | | |
|---|---|---|---|---|---|
| 5,939,051 A | 8/1999 | Santalucia et al. | JP | 01/206969 | 8/1989 |
| 6,056,992 A | 5/2000 | Lew | JP | 02/083030 | 3/1990 |
| 6,190,644 B1 | 2/2001 | McClanahan et al. | JP | 5039213 | 2/1993 |
| 6,238,690 B1 | 5/2001 | Kiefer et al. | JP | 9507481 | 7/1997 |
| 6,239,690 B1 | 5/2001 | Burbidge et al. | JP | 2000281548 | 10/2000 |
| 6,261,540 B1 | 7/2001 | Nelson | JP | 2002526394 | 8/2002 |
| 6,290,933 B1 | 9/2001 | Durga et al. | JP | 2003002815 | 1/2003 |
| 6,365,209 B2 | 4/2002 | Cherukuri et al. | WO | WO 88/00463 | 1/1988 |
| 6,379,654 B1 | 4/2002 | Gebreselassie et al. | WO | WO 92/06160 | 4/1992 |
| 6,416,744 B1 | 7/2002 | Robinson et al. | WO | WO 95/33034 | 12/1995 |
| 6,428,827 B1 | 8/2002 | Song et al. | WO | WO 96/19193 | 6/1996 |
| 6,471,945 B2 * | 10/2002 | Luo et al. ............. 424/48 | WO | 9702009 | 1/1997 |
| 6,475,469 B1 | 11/2002 | Montgomery | WO | WO 97/02011 | 1/1997 |
| 6,479,071 B2 * | 11/2002 | Holme et al. ............ 424/440 | WO | 9803076 | 1/1998 |
| 6,485,739 B2 | 11/2002 | Luo et al. | WO | WO 98/18339 | 5/1998 |
| 6,506,366 B1 | 1/2003 | Leinen et al. | WO | WO 98/23165 | 6/1998 |
| 6,534,091 B1 | 3/2003 | Garces Graces et al. | WO | WO 98/29088 | 7/1998 |
| 6,555,145 B1 | 4/2003 | Cherukuri et al. | WO | WO 99/27798 | 6/1999 |
| 6,685,916 B1 | 2/2004 | Holme et al. | WO | WO 99/43294 | 9/1999 |
| 6,692,778 B2 | 2/2004 | Yatka et al. | WO | WO 99/43924 | 9/1999 |
| 6,696,044 B2 | 2/2004 | Luo et al. | WO | 0035398 | 6/2000 |
| 6,730,291 B2 * | 5/2004 | Lawlor ............. 424/48 | WO | WO 00/35296 | 6/2000 |
| 6,759,066 B2 | 7/2004 | Savage et al. | WO | WO 00/35298 | 6/2000 |
| 6,926,916 B1 | 8/2005 | Day et al. | WO | WO 00/75274 | 12/2000 |
| 7,022,314 B2 | 4/2006 | Barabolak et al. | WO | 0168045 | 9/2001 |
| 2001/0043907 A1* | 11/2001 | Luo et al. ............. 424/48 | WO | WO 02/055649 | 7/2002 |
| 2002/0044968 A1 | 4/2002 | Van Lengerich | WO | 03020047 | 3/2003 |
| 2002/0150616 A1 | 10/2002 | Vandecruys | WO | 03024415 | 3/2003 |
| 2003/0072841 A1 | 4/2003 | Rajaiah et al. | WO | 03039503 | 5/2003 |
| 2003/0099740 A1 | 5/2003 | Colle et al. | WO | 2005003712 | 2/2005 |
| 2003/0113274 A1 | 6/2003 | Holme et al. | WO | 2005051427 | 6/2005 |
| 2004/0136928 A1 | 7/2004 | Holme et al. | | | |
| 2005/0025721 A1 | 2/2005 | Holme et al. | | | |

FOREIGN PATENT DOCUMENTS

| | | |
|---|---|---|
| EP | 0067595 | 12/1982 |
| EP | 0252374 | 1/1988 |
| EP | 0255260 | 2/1988 |
| EP | 0453397 | 3/1991 |
| EP | 0434321 | 6/1991 |

OTHER PUBLICATIONS

Gantrez® AN; ISP Polymers for Oral Care; http://www.ispcorp.com/products/oralcare/content/brochure/oral/prod.html, printed Jun. 9, 2004, pp. 1-5.

Demmers et al.; Effect of Surfactants and Proteolytic Enzymes on Artificial Calculus Formation; Surfactants and Enzymes: Calculus: pp. 28-35.

* cited by examiner

US 7,641,927 B2

CHEWING GUM AND CONFECTIONERY COMPOSITIONS CONTAINING A STAIN REMOVING COMPLEX, AND METHODS OF MAKING AND USING THE SAME

FIELD OF THE INVENTION

The present invention is generally directed to chewing gum and confectionery compositions employing a stain removing complex comprising a stain removing agent and a cyclodextrin compound and to processes of making the compositions in a manner which facilitates the delivery and release of the stain removing agent to the tooth surfaces in the oral cavity of the consumer.

BACKGROUND OF THE INVENTION

Unblemished white teeth have long been considered cosmetically desirable. Unfortunately, in the absence of thorough dental cleaning, teeth can become discolored or stained from color-causing substances present in food, beverages, tobacco, and the like, and internal sources such as blood, amalgam-based fillings, and antibiotics (e.g., tetracycline). The tooth structures that are generally responsible for presenting a stained appearance are enamel, dentin, and the acquired pellicle. Tooth enamel is predominantly formed from inorganic material, mostly in the form of hydroxyapatite crystals, and further contains approximately 5% organic material primarily in the form of collagen. In contrast, dentin is composed of about 20% protein including collagen, the balance consisting of inorganic material, predominantly hydroxyapatite crystals, similar to that found in enamel. The acquired pellicle is a proteinaceous layer or matrix that forms continuously over the surface of the tooth. Although the acquired pellicle can be removed through intensive mechanical cleaning, it quickly regenerates soon thereafter.

Discoloration of teeth can result from intrinsic and/or extrinsic staining. Intrinsic staining occurs when staining compounds penetrate the enamel and even the dentin, or alternatively, such staining arises from sources within the tooth. Typically such staining can only be removed through chemical methods of tooth cleaning. In contrast, extrinsic staining of the acquired pellicle arises as a result of compounds such as tannins and other polyphenolic compounds becoming trapped in and tightly bound to the proteinaceous layer on the surface of teeth. Discoloration from this type of staining can usually be removed by mechanical methods of tooth cleaning.

Stain removing agents have been used to remove such staining to whiten and clean teeth. One class of effective stain removing agents includes surfactants such as, for example, sodium stearate, which have been found to exhibit good stain removing activity on teeth. Such stain removing agents have been incorporated into stain removing chewing gum and confectionery compositions to clean and whiten teeth as disclosed in U.S. Pat. Nos. 6,471,945, 6,479,071 and 6,485,739. Other classes of stain removing agents include, for example, anti-bacterial agents such as thymol, triclosan, chlorhexidine and the like.

Although some surfactants and anti-bacterial agents which are slightly water soluble act effectively as stain removing agents, the limited solubility of such agents in water or aqueous environments adversely affects their ability to be delivered from the stain removing composition to the tooth surfaces in the mouth. This shortcoming is especially apparent in chewing gum compositions. Further, these surfactants and anti-bacterial agents do not effectively penetrate through the complex barriers typically present in saliva and on the tooth surfaces, thus further reducing their bioavailability for removing stain. Accordingly, higher levels of surfactants or anti-bacterial agents are typically needed to compensate their low release rate, and increase their bioavailability in the mouth of the consumer.

Higher levels of surfactant and/or anti-bacterial agent in stain removing compositions increase manufacturing costs with little improvement to whitening or stain removing efficacy of the composition. In addition, it has been determined that stain removing compositions containing higher levels of surfactant or anti-bacterial agent typically exhibit less than desirable organoleptic and taste characteristics. For example, chewing gum and confectionery compositions containing elevated levels of surfactant typically exhibit a soapy or undesirable taste, and unpleasant mouthfeel. In chewing gum, the elevated levels of surfactant also adversely affect the structure of the gum base resulting in premature disintegration, and unsatisfactory chew characteristics.

Cyclodextrin compounds are known to form complexes with many compounds. The cyclodextrin molecule includes glucopyranose units arranged in a ring-like configuration having all the secondary hydroxyl groups located on one side of the ring and all primary hydroxyl groups located on the other side. Generally, 'Y-, β-, and ε-cyclodextrins contain 6, 7 and 8 cyclic glucopyranose units, respectively, in the ring shell. The lining of the internal "cavity" is formed from hydrogen and glucosidic oxygen-bridge atoms, and thus the lining is slightly apolar.

It would therefore be a significant advance in the art of providing a stain removing chewing gum composition, which enhances the overall solubility and release rate of a stain removing agent therefrom. It would be a further advance in the art to provide a stain removing chewing gum composition which enhances the solubility and the release rate of the stain removing agent through the use of a complex of a stain removing agent and a cyclodextrin compound. The complex provides effective cleaning of dental material including teeth and can be effectively incorporated into a chewing gum composition and released therefrom during the chewing process in a manner which provides an effective amount of the stain removing agent. The chewing gum composition would then not only provide chewing satisfaction to the user, but would also provide a beneficial dental effect. There is a need for a chewing gum composition having enhanced tooth whitening and stain removal efficacy while avoiding or at least substantially minimizing the consequences of the above-described problems encountered in the prior art.

Confectionery compositions are well known in the art. Such compositions include, for example, hard boiled candies, nougats, panning goods, gel confections, centerfill confections, fondants, consumable thin films, and the like. Unlike chewing gum compositions, which often remain in the mouth for up to or exceeding several minutes, confectionery compositions tend to have a short life in the mouth because they dissolve relatively quickly upon chewing. Nonetheless, it would be of great benefit to provide confectionery compositions with an effective amount of a stain removing agent to provide such products to render them capable of providing a beneficial dental effect.

SUMMARY OF THE INVENTION

The present invention is generally directed to stain removing chewing gum and confectionery compositions in which a stain removing complex of a stain removing agent and a cyclodextrin compound is effectively incorporated therein so that a sufficient amount of the stain removing agent can be rapidly released therefrom for initiating a stain removing effect on a tooth surface. The cyclodextrin compound stabilizes the stain removing agent, thereby enhancing the release and delivery of the stain removing agent from the composition to the tooth surface, while maintaining desirable organoleptic and taste properties in the composition. It has been determined that complexes formed from the stain removing agent and the cyclodextrin compound significantly enhance the overall stain removing efficacy of the composition.

In a particular aspect of the present invention, there is provided a stain removing composition including a chewing gum composition and a confectionery composition comprising a stain removing complex of a stain removing agent and a cyclodextrin compound, wherein the stain removing agent is present in a manner which enables an effective amount of the stain removing agent to be released from the composition and thus the complex provides enhanced delivery of the stain removing agent over gum compositions containing the stain removing agent alone. Preferably, the stain removing agent is selected from a surfactant and an anti-bacterial agent, and more preferably from anionic and nonionic surfactants.

In accordance with one aspect of the present invention, there is provided a stain removing chewing gum composition comprising a gum base and a stain removing complex of a stain removing agent and a cyclodextrin compound wherein the stain removing agent is present in a manner which enables an effective amount of the stain removing agent to be released from the chewing gum composition. A method of removing stains by employing the chewing gum compositions of the present invention is also disclosed.

In one particular aspect of the present invention, there is provided a stain removing chewing gum composition comprising a gum base core and a coating comprised of at least one layer with at least one of the core and coating comprising a stain removing complex of a stain removing agent and a cyclodextrin compound, wherein the stain removing agent is present in a manner which enables an effective amount of the stain removing agent to be released from the chewing gum composition.

In a further aspect of the invention, there is provided a chewing gum composition in which the complex of the stain removing agent with the cyclodextrin compound is added at a time in the process of making the same which enhances release of the stain removing agent during the chewing operation.

In a still further aspect of the present invention there is provided a stain removing confectionery composition comprising a carrier and a stain removing complex of a stain removing agent and a cyclodextrin compound wherein the stain removing agent is present in a manner which enables an effective amount of the stain removing agent to be released from the confectionery composition. A method of removing stains by employing the confectionery compositions of the present invention is also disclosed.

In a preferred form of the present invention, the stain removing agents for both the gum and confectionery compositions include, for example, medium and long chain fatty acid esters and salts, more preferably containing 14-20 carbon atoms, and especially sodium stearate and sodium palmitate and combinations thereof, as well as a mixture of citric acid esters of mono- and di-glycerides.

BRIEF DESCRIPTION OF THE DRAWINGS

The following drawings are illustrative of embodiments of the present invention and are not intended to limit the invention as encompassed by the claims forming part of the application.

DETAILED DESCRIPTION OF THE INVENTION

Figure 1:
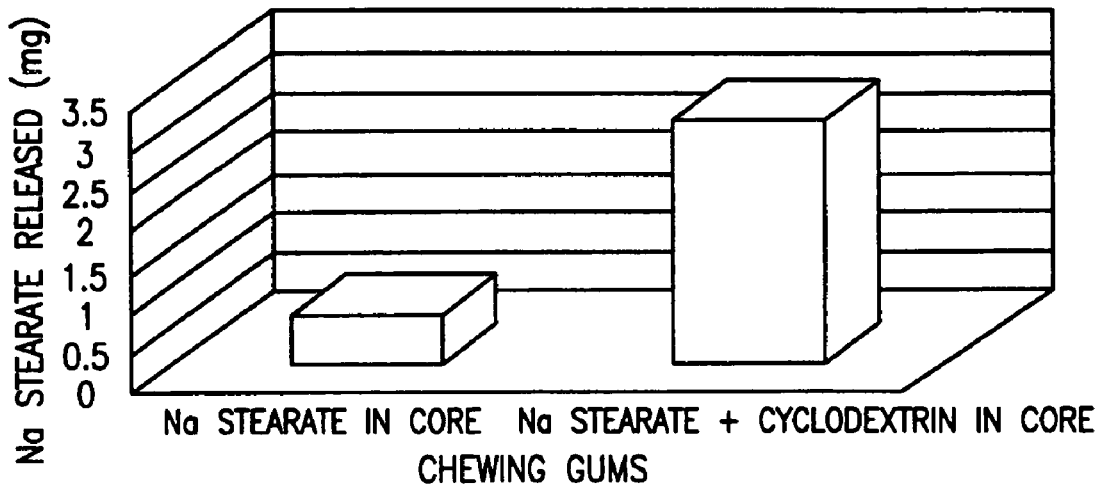
FIG. 1 is a graph comparing the release of sodium stearate from chewing gum compositions containing either free sodium stearate or sodium stearate complexed with $\beta$-cyclodextrin in accordance with the present invention.

The present invention is directed to chewing gum and confectionery compositions possessing stain removing properties useful for whitening and cleaning tooth surfaces through treatment with the same. Such compositions are especially suitable for removing stains, which adhere to, or are entrapped in materials on the surface of teeth, and for preventing build-up of the stain entrapping material and stains on the tooth surfaces. The compositions of the present invention are meant to include products, which are not intentionally swallowed for purposes of systemic administration of therapeutic agents, but are retained in the oral cavity for a sufficient time to contact the tooth surfaces to provide beneficial dental stain removing and whitening effect. The compositions of the present invention may be in a form selected from, for example, centerfill gums, stick gums, hard candies, mints, lozenges, tablets, consumable thin films, and the like.

The compositions of the present invention contain cyclodextrin compounds which are capable of solubilizing stain removing agents to form a water soluble complex. The cyclodextrin compound significantly enhances the release and bioavailability of the stain removing agent. In addition, the cyclodextrin compound facilitates the penetration of the stain removing agent through the lipophilic barriers of dental material such as teeth to reach areas in need of stain removal, thus further improving the whitening or cleaning effect of the stain removing agents. The compositions of the present invention are also formulated to contain reduced levels of stain removing agents for attaining cost savings, while maintaining desirable organoleptic characteristics and tooth whitening and cleaning effects.

Cyclodextrins are generally formed by treating starch with a glucosyl-transferase enzyme (CGTase) to catalytically transform the starch into cyclic polymers containing six, seven or eight glucose units. These compounds are composed of a ring-like structure with a hollow cavity that is relatively hydrophobic due in part to the presence of hydrogen atoms and glycosidic oxygen atoms in the hollow cavity. The outer surfaces of the ring are hydrophilic due to the presence of polar hydroxyl groups on the outer edges of the ring. The hydrophobic nature of the cavity allows suitably sized molecules to be complexed through hydrophobic interactions.

Molecules or functional groups of molecules having molecular sizes that are able to fit within the cavity, and possessing a higher degree of hydrophobicity (i.e., less hydrophilic) than water, will occupy or position themselves in the cyclodextrin cavity. In aqueous solutions, the water molecules occupy the apolar cyclodextrin cavity corresponding to a higher energy state due to the polar-apolar interaction therebetween. If molecules less polar than water are present, then such molecules readily displace the water molecules in the cavity to achieve a more stable, lower energy state. In the present invention, the stain removing agents are typically either apolar or include a functional group that is less hydrophilic than water as will be described hereinafter.

Except as otherwise noted, the amount of the ingredients incorporated into the compositions according to the present invention is designated as % by weight based on the total weight of the composition.

Suitable cyclodextrin compounds useful in the present invention include α-, β-, 'Y-cyclodextrin compounds, derivatives thereof and combinations thereof. In a preferred embodiment, the cyclodextrin compound is selected from hydroxypropyl β-cyclodextrin, hydroxyethyl β-cyclodextrin, hydroxypropyl 'Y-cyclodextrin, hydroxyethyl 'Y-cyclodextrin, α-cyclodextrin, methyl β-cyclodextrin and the like, and combinations thereof. β-cyclodextrin is a more preferred cyclodextrin compound. Suitable cyclodextrin compounds include those that are typically soluble in aqueous solutions in amounts of at least 10% by weight based on the total weight of the solution.

For the stain removing compositions of the present invention, the amount of the cyclodextrin compound will be an amount sufficient to complex the stain removing agent contained within the composition and can be routinely determined by those practicing in the art. By way of example, the amount of the cyclodextrin compound may range from about 0.01% by weight to 20% by weight, preferably from about 0.1% by weight to 10% by weight based on the total weight of the composition.

In accordance with the present invention, the stain removing agent is complexed with a cyclodextrin compound for enhancing effective delivery and release of the stain removing agent in the chewing gum and confectionery compositions.

The terms "stain removing effective amount" or "effective amount" as used herein mean an amount of the stain removing agents disclosed herein that is sufficient to prevent, eliminate or at least reduce the presence of stains on dental surfaces in warm-blooded animals including humans, but low enough to avoid any undesirable side effects. The stain removing effective amount of the stain removing agent of the present invention may vary with the type and extent of the particular stain, the age and physical condition of the warm-blooded animal including humans being treated, the duration of treatment, the nature of concurrent therapy, the specific form (i.e., salt) of the stain removing agent employed, the cyclodextrin compound used, and the particular carrier from which the stain removing agent is applied.

The amount of the stain removing agents in the composition of the present invention will also depend on the type of composition (e.g., chewing gum, lozenge, mint, hard candy, confectionery, and the like) used to apply the stain removing agent complex to the dental surfaces, the differences in the efficiency of the compositions contacting the teeth and the effective amount of the composition generally used. The amount may also depend on the level and intensity of the stains present.

Suitable examples of the stain removing agents are those which are apolar or include at least one apolar functional group that is typically more hydrophobic than water. Examples of such stain removing agents include, for example, medium and long chain fatty acids, organic acids, anti-bacterial organic compounds, organic peroxides, perbenzoic acids, castor oil, sulfated butyl oleate, medium and long chain fatty acid esters and salts in particular the sodium and potassium salts of the stearate and palmitate, ricinoleate and methyl and ethyl esters thereof, sodium oleate, salts of fumaric acid, potassium glomate, organic acid esters of mono- and di-glycerides such as stearyl monoglyceridyl citrate, succistearin, dioctyl sodium sulfosuccinate, glycerol tristearate, lecithin, hydroxylated lecithin, sodium lauryl sulfate, acetylated monoglycerides, succinylated monoglycerides, monoglyceride citrate, ethoxylated mono- and di-glycerides, sorbitan monostearate, calcium stearyl-2-lactylate, sodium stearyl lactylate, lactylated fatty acid esters of glycerol and propylene glycol, glycerol-lactoesters of $C_8$-$C_{24}$ fatty acids, preferably glycerol-lactoesters of $C_{14}$-$C_{20}$ fatty acids, polyglycerol esters of $C_8$-$C_{24}$ fatty acids, preferably polyglycerol esters of $C_{14}$-$C_{20}$ fatty acids, propylene glycol alginate, sucrose $C_8$-$C_{24}$ fatty acid esters, preferably sucrose $C_{14}$-$C_{20}$ fatty acid esters, diacetyl tartaric or citric acid esters of mono- and di-glycerides, triacetin and the like and combinations thereof. Suitable examples of anti-bacterial organic compounds as stain removing agents include thymol, eugenol, menthol, tea tree oil, cardamom oil, carvacrol, triclosan, fernesol, neem oil, chlorhexidine, magnolia extract, parabens, benzethonium chloride and combinations thereof.

Exemplary preferred stain removing agents are selected from sodium stearate and sodium palmitate and combinations thereof, sodium oleate, a mixture of citric acid esters or lactic acid esters of monoglycerides and diglycerides, as for example, glycerol stearate lactate, glycerol stearate and glycerol lactate and combinations thereof, sucrose iononostearate, sucrose distearate, sucrose monolaurate, sucrose dilaurate, polyglycerol esters of monostearate, polyglycerol esters of monolaurate and combinations thereof.

The more exemplary preferred stain removing agents for use in chewing gum compositions of the present invention are sodium stearate, usually available as an approximate 50/50 mixture with sodium palmitate, and, a mixture of at least one citric acid ester of mono and/or di-glycerides. A suitable example of a commercial stain removing agent in the latter class is IMWITOR 370® sold by Condea Vista Company. A further preferred stain removing agent is composed of a mixture of lactic acid esters of monoglycerides and diglycerides.

The amount of the stain removing agent for chewing gum compositions is typically from about 0.01 % to 20% by weight based on the total weight of the chewing gum composition. The preferred amount of the stain removing agent is from about 0.1% to 10% by weight. The amount of the stain removing agent will vary depending upon the particular individual or combinations of stain removing agents employed, the type of other components of the chewing gum composition and their respective amounts. For example, a preferred amount of sodium stearate is about 0.5% by weight, a preferred amount of a mixture of lactic acid esters of monoglycerides and diglycerides is about 0.6% by weight while a preferred amount of a mixture of citric acid esters of mono- and di-glycerides (IMWITOR 370®) is from about 0.6% to 1.0% by weight.

The preferred stain removing agents for use in the confectionery compositions of the present invention are sodium stearate, sodium palmitate and combinations thereof. As indicated in connection with the chewing gum compositions, sodium stearate is usually available as an approximately evenly divided mixture with sodium palmitate.

The effective amount of the stain removing agent which may be employed in the confectionery compositions of the present invention will vary over a range depending on, for example, the type of confectionery composition, the particular individual or combination of stain removing agents, and the cyclodextrin compound employed. Generally, the amount of stain removing agent used in the confectionery compositions of the present invention will exceed the amount of the stain removing agent employed for the chewing gum composition for a particular stain removing agent.

Typically, the stain removing agent for confectionery compositions will be present in an amount of from about 0.1% to 10% by weight based on the total weight of the confectionery composition. The preferred amount of the stain removing agent is from about 0.5% to 5% by weight.

The formulation of the gum and confectionery compositions and the manner in which the stain removing complexes are added to the compositions facilitates a more efficient delivery and release of the stain removing agent. The stain removing complexes effectively enhance the solubility of the stain removing agent in aqueous environments while facilitating the penetration of the stain removing agent through the lipophilic barrier normally present on dental surfaces including the surface of the teeth, thereby enabling the stain removing agent to more readily reach and contact areas that require stain removal. In this manner, amounts of the stain removing agent coming into contact with dental surfaces including tooth surfaces is significantly enhanced while the organoleptic properties commonly associated with such products are improved or at least maintained.

For both the chewing gum and confectionery compositions of the present invention, the stain removing agent and the cyclodextrin compound forming the stain removing complex of the present invention are preferably combined in a molar ratio of the stain removing agent to the cyclodextrin compound of 1:0.1-10, more preferably 1:0.1-5, and most preferably 1:1. It will be understood that the molar ratio of the complex may vary according to several factors including, but not limited to, the type of composition, the types of additives or excipients present, and the like. The stain removing complex formed by the combination of the stain removing agent and the cyclodextrin compound of the present invention may be present in amounts ranging from about 0.001 % to 20% by weight based on the total weight of the composition, and more preferably, 0.1% to 15% by weight.

As discussed above, the process of complexing cyclodextrin and the stain removing agent of the present invention involves a stoichiometric molecular phenomenon wherein the stain removing agent interacts with the cavity of the cyclodextrin molecule and is entrapped therein to form a stable complex. Only a portion of the stain removing agent is required to interact with the cyclodextrin molecule to form the complex.

The stain removing complex of the present invention may be prepared by dissolving cyclodextrin in a solvent preferably a polar solvent such as water. Thereafter, the stain removing agent is added to the cyclodextrin solution. The stain removing agent or a portion of the stain removing agent that is apolar or less polar than water associates readily with the apolar cavity of the cyclodextrin molecule. Optionally, the solution may be heated to enhance solubility of the cyclodextrin compound and stain removing agent to facilitate the formation of the complex. The stain removing agent is preferable in either a water soluble form or dispersed in the form of fine particles. Once the solution containing the stain removing agent and cyclodextrin is thoroughly mixed, the complex may be obtained by removing the solvent by evaporation or filtration. The resulting dried complex is added to the edible composition.

The compositions of the present invention further comprise a carrier, in an amount appropriate to accommodate the other components of the formulation including the stain removing complex. The term "carrier" refers to an orally acceptable vehicle capable of being mixed with the active components for delivery to the oral cavity for tooth whitening and cleaning purposes, and which will not cause harm to warm-blooded animals including humans. The carriers further include those components of the composition that are capable of being commingled without interaction in a manner which would substantially reduce the composition's stability and/or efficacy for dental stain removal in the oral cavity in warm-blooded animals including humans, in accordance with the compositions and methods of the present invention.

The carriers of the present compositions can include one or more compatible solid or liquid filler diluents or encapsulating substances, which are suitable for oral administration. The carriers or excipients of the present invention may be chosen to provide an appropriate mode of delivery, for example, solutions, colloidal dispersions, emulsions, suspensions, gels, powders, solids, and the like, and can include conventional components typically associated with chewing gums and confectioneries. Carriers suitable for the preparation of compositions of the present invention are well known in the art. Their selection will depend on secondary considerations like taste, cost, shelf stability and the like.

Types of additives or ingredients, which may also be included in the present compositions of the present invention, include, for example, fluoride ion releasing compounds, thickening agents, humectants, flavoring and sweetening agents, anticalculus agents, alkali metal bicarbonate salts, solvents, remineralizers and other miscellaneous additives such as anti-inflammatory agents, and the like. Suitable remineralizers include, for example, calcium phosphate salts such as α-tricalcium phosphate, monocalcium phosphate monohydrate, anhydrous dicalcium phosphate, dicalcium phosphate dihydrate, octacalcium phosphate or tetracalcium phosphate; and calcium glycerophosphate, and combinations thereof.

Chewing gum compositions typically include one or more of gum bases, flavoring agents and bulk sweeteners. The term "confectioneries" as used herein includes, but is not limited to: nougats, candies, panning goods, gel confections, fondants, lozenges, hard boiled candies, mints, troches, pastilles, microcapsules, and other solid forms including freeze dried forms (cakes, wafers, and tablets) and fast dissolving solid forms including compressed tablets and water soluble thin films. The term "fast dissolving solid form" as used herein means that the solid dosage form dissolves in less than about 60 seconds, preferably less than about 15 seconds, more preferably less than about 5 seconds, in the oral cavity. Lozenges include discoid shaped solids comprising a therapeutic agent in a flavored base. The base may be a hard sugar candy, glycerinated gelatin, or combination of sugar with sufficient mucilage to give it form. Lozenge compositions (compressed tablet type) typically include one or more fillers (compressible sugar), flavoring agents and lubricants.

The chewing gum compositions of the present invention, may be coated or uncoated and be in the form or slabs, sticks, pellets, balls and the like. The composition of the different forms of the chewing gum compositions will be similar but may vary with regard to the ratio of the ingredients. For example, coated gum compositions may contain a lower percentage of softeners. Pellets and balls have a small chewing gum core, which is then coated with either a sugar solution or a sugarless solution to create a hard shell. Slabs and sticks are usually formulated to be softer in texture than the chewing gum core. For practice of the present invention however, in order to overcome any detrimental softening effect the surfactant active may have on the gum base, it is preferred to formulate a slab or stick gum having a firmer texture (i.e. with less softener than is typically employed).

Centerfilled gum is another common gum form. The gum portion has a similar composition and mode of manufacture to that described above. However, the centerfill is typically an aqueous solution or gel, which is injected into the center of the gum during processing. The stain removing complex of the present invention may optionally be incorporated into the centerfill during manufacture of the fill or into the chewing gum. The centerfill gum may also be optionally coated and may be prepared in various forms such as in the form of a lollipop.

For practice of the present invention it is preferred to use a coated gum wherein the stain removing complex is in at least one of the core and the coating. Most preferred for removing stains is a coated gum wherein the stain removing complex is at least in the coating.

The chewing gum composition of the present invention includes gum base and most of the other typical chewing gum composition components such as sweeteners, softeners, flavorants and the like. A stain removing complex of a stain removing agent and a cyclodexerin compound is employed in the present invention wherein the stain removing agent is selected from anionic and non-ionic surfactants. The chewing gum composition may contain a reduced amount of softening agents such as lecithin or glycerin or may eliminate softeners. In addition, the chewing gum composition may contain a larger amount of sugar alcohols than conventional chewing gum compositions to facilitate delivery of the stain removing complex employed in the present invention to the tooth surfaces.

In accordance with one aspect of the chewing gum composition of the present invention, the stain removing complex is added during the manufacture of the chewing gum composition, that is, with the sweeteners, flavorants and the like. In another aspect of the present invention, the stain removing complex is added as one of the last steps, preferably the last step in the formation of the chewing gum composition. Applicants have determined that this process modification incorporates the stain removing complex into the gum composition without materially binding the stain removing complex therein such as may occur if the stain removing complex is mixed directly with the gum base. Thus, the stain removing, while only loosely contained within the gum composition can be more effectively released therefrom during a typical chewing operation. Thus a material portion of the stain removing complex is free of the gum base.

In a further aspect of the invention, the insoluble gum base generally comprises elastomers, elastomer plasticizers, waxes, fats, oils, emulsifiers, fillers, texturizers and may include a desirable stain removing agent as hereinafter described.

Elastomers constitute from about 5 to 95% by weight of the base, preferably 10 to 70% by weight and most preferably 15 to 45% by weight. Examples of elastomers include synthetic elastomers such as polyisobutylene, polybutylene, isobutylene-isoprene co-polymers, styrene-butadiene co-polymers, polyvinylacetate and the like. Elastomers may also include natural elastomers such as natural rubber as well as natural gums such as jelutong, lechi caspi, perillo, massaranduba balata, chicle, gutta hang kang or combinations thereof. Other elastomers are known to those of ordinary skill in the art.

Elastomer plasticizers modify the finished gum firmness this when used in the gum base. Elastomer plasticizers are typically present in an amount of from about 0 to 75% by weight of the gum base, preferably from about 5 to 45% by weight and most preferably from about 10 to 30% by weight. Examples of elastomer plasticizers include natural rosin esters such as glycerol ester of partially hydrogenated rosin, glycerol ester of tall oil rosin, pentaerythritol esters of partially hydrogenated rosin, methyl and partially hydrogenated methyl esters of rosin, and the like. Synthetic elastomer plasticizers such as terpene resins may also be employed in gum base composition.

Waxes include synthetic and naturally occurring waxes such as polyethylene, bees wax, carnauba and the like. Petroleum waxes such a paraffin may also be used. The waxes may be present in the amount of from about 0 to 30% by weight of the gum base. Waxes aid in the curing of the finished gum and help improve the release of flavor and may extend the shelf life of the product.

Fillers modify the texture of the gum base and aid processing. Examples of such fillers include magnesium and aluminum silicates, clay, alumina, talc, titanium oxide, cellulose polymers, and the like. Fillers are typically present in an amount of from 1 to 60% by weight.

Examples of softeners used in gum base include hydrogenated and partially hydrogenated vegetable oils, cocoa butter, glycerol monostearate, glycerol triacetate, di- and tri-glycerides, fatty acids such as stearic acid, palmitic acid, oleic acid, linoleic acid, linolenic acid and the like.

The gum base constitutes between 5% and 95% by weight of the chewing gum composition, more typically 10% to 50% by weight, and most preferably 25% to 35% by weight of the chewing gum. A higher amount of gum base is preferred.

Other ingredients used in chewing gum compositions include sweeteners, both natural and artificial and both sugar and sugarless. Sweeteners are typically present in the chewing gum compositions in amounts of from about 20% to 80% by weight, preferably from about 30% to 60% by weight. Sugarless sweeteners include, but are not limited sugar alcohols such as sorbitol, mannitol, xylitol, hydrogenated starch hydrolysates, maltitol and the like may also be present. High intensity sweeteners such as sucralose, aspartame, neotame, salts of acesulfame, and the like. High intensity sweeteners are typically present in amounts of up to 1.0% by weight.

Flavoring agents which can vary over a wide range may be selected in amounts from about 0.1% to 10% by weight, preferably from about 0.5% to 5.0% by weight. Flavoring agents for use in chewing gum compositions are well known and include citrus oils, peppermint oil, spearmint oil, oil of wintergreen, menthol and the like.

Softeners may be present to modify the texture of the chewing gum composition. Unlike typical gum compositions, softeners in the compositions of the present invention are typically present in reduced amounts of from about 0.5% to 10% by weight based on the total weight of the chewing gum.

Other materials which may be present in the gum composition of the present invention include antioxidants (e.g. butylated hydroxyanisole, butylated hydroxytoluene, β-carotenes, tocopherols, colorants, flavorants and the like.

Coating techniques for applying a coating for a chewing gum composition such as pan and spray coating are well known. Preferred in the practice of the present invention is coating with solutions adapted to build a hard candy layer. Both sugar and sugar alcohols may be used for this purpose together with high intensity sweeteners, colorants, flavorants and binders. When the stain removing complex is provided in the coating of a chewing gum composition, a solution of the stain removing complex is preferably, alternately, applied with the flavorant.

The sweetener may be present in an amount of from about 30% to 80% by weight of the coating syrup. The binder may be present in an amount of from about 1% to 15% by weight of the coating syrup. Minor amounts of the optional additives may also be present. The sweeteners suitable for use in the coating syrup comprise sugarless sweeteners such as the polyhydric alcohols, e.g., xylitol, sorbitol, mannitol, and combinations, thereof; as well as maltitol, isomaltitol, hydrogenated starch hydrolysates, and hydrogenated glucose syrups. Mono-, di- and polysaccharide may also be included. For example, sugars such as sucrose, fructose, glucose, galatose and maltose may also be employed as a sweetener. Other sweeteners suitable for use in the coating syrup include, but are not limited to free saccharin acid, water soluble salts of saccharin, cyclamate salts, palatinit dihydrochalcones, glycyrrhizin, L-aspartyl-L-phenylalanine methyl ester, amino acid based sweeteners such as neotame, aspartame and the like, talin, steviosides, dihydrochalcone compounds, acesulfame salts and combinations thereof.

Other components may be added in minor amounts to the coating syrup and include moisture absorbing compounds, anti-adherent compounds, dispersing agents and film forming agents. The moisture absorbing compounds suitable for use in the coating syrups include mannitol or dicalcium phosphate. Examples of useful anti-adherent compounds, which may also function as a filler, include talc, magnesium trisilicate and calcium carbonate. These ingredients may be employed in amounts of about 0.5% to 5% by weight of the syrup. Examples of dispersing agents, which may be employed in the coating syrup, include titanium dioxide, talc or other anti-adherent compounds as set forth above.

The coating syrup is usually heated and a portion thereof deposited on the cores. Usually a single deposition of the coating syrup is not sufficient to provide the desired amount or thickness of coating and it usually will be necessary to apply second, third or more coats of the coating syrup in order to build up the weight and thickness of the coating to desired levels with layers allowed to dry in-between coats.

A preferred aspect of the chewing gum composition invention adds a stain removing complex to the coat. The stain removing complex is preferably applied subsequent to the syrup coating. It is preferred to then apply a coat of high intensity sweetener prior to coating with the stain removing complex. Application of the stain removing complex is preferably done alternatively to application of a flavorant solution. In the practice of the present invention the stain removing complex may be applied as a solution or may be applied as a dry charge or, where applicable, melted and applied. For fatty acid salts a dry charge may be preferred. In coating a chewing gum composition, the applications of coating syrup are continued until the average gum piece weight reaches the required coating weight, preferably until the coat comprises from about 20% to 30% by weight of the final pellet weight.

The present invention also encompasses confectionery compositions containing a suitable selection of stain removing complexes of the present invention. Confectionery compositions include compressed tablets such as mints, hard boiled candies, nougats, gels, centerfill confections, fondants, panning goods, consumable thin films and other compositions falling within the generally accepted definition of confectionery compositions.

Confectionery compositions in the form of pressed tablets such as mints may generally be made by combining finely sifted sugar or sugar substitute, flavoring agent (e.g. peppermint flavor) bulking agent such as gum arabic, and an optional coloring agent. The flavoring agent, bulking agent are combined and then gradually the sugar or sugar substitute are added along with a coloring agent if needed.

The product is then granulated by passing through a seize of desired mesh size (e.g. 12 mesh) and then dried typically at temperatures of from about 55° C. to 60° C. The resulting powder is fed into a tableting machine fitted with a large size punch and the resulting pellets are broken into granules and then pressed.

High boiled candies typically contain sugar or sugar substitute, glucose, water, flavoring agent and optional coloring agent. The sugar is dissolved in the water and glucose is then added. The mixture is brought to a boil. The resulting liquid to which may previously have been added a coloring agent is poured onto an oiled slab and cooled. The flavoring agent are then added and kneaded into the cooled mass. The resulting mixture is then fed to a drop roller assembly known in the art to form the final hard candy shape.

A nougat composition typically includes two principal components, a high boiled candy and a frappe. By way of example, egg albumen or substitute thereof is combined with water and whisked to form a light foam. Sugar and glucose are added to water and boiled typically at temperatures of from about 130° C. to 140° C. and the resulting boiled product is poured into a mixing machine and beat until creamy.

The beaten albumen and flavoring agent are combined with the creamy product and the combination is thereafter thoroughly mixed.

Other preferred confectionery compositions of the present invention are consumable thin films or thin strips. Such orally consumable films typically comprise a rapidly dissolvable non-self-adhering polymer-based thin film vehicle. The thin film compositions are typically administered to the oral cavity where they rapidly dissolve upon contact with saliva and provide rapid delivery of the active ingredients. LISTERINE® POCKETPAKS® brand oral care strip products made by PFIZER, Inc. of Morris Plains, N.J. are perhaps the most successful examples of an edible thin film composition, and has been used effectively in delivering therapeutic agents particularly antimicrobial agents in the form of LISTERINE® essential oils to the oral cavity. Components of such compositions generally include water in an amount up to 75% by weight based on the total weight of the oral care composition, a water soluble film forming polymer including, but not limited to, pullulan, in an amount of up to 25% by weight, a flavoring agent in an amount of from about 0.01% to 10% by weight, and optionally, include other components such as copper salts in an amount of from about 0.01% to 5% by weight, or essential oils including, but not limited to, methyl salicylate, menthol, eucaplytol and thymol in amounts ranging from about 0.01 % to 20% by weight.

Further details regarding the preparation of confectionery compositions can be found in Skuse's Complete Confectioner ($13^{th}$ Edition) (1957) including pp. 41-71, 133-144, and 255-262; and Sugar Confectionery Manufacture ($2^{nd}$ Edition) (1995), E. B. Jackson, Editor, pp.129-168, 169-188, 189-216, 218-234, and 236-258 each of which is incorporated herein by reference.

In another embodiment of the present invention, there is provided a method of removing stains from dental surfaces of the oral cavity in warm-blooded animals including humans, by administering, applying or contacting a stain removing effective amount of the compositions of the present invention, including the chewing gum and confectionery compositions, to the oral cavity. The stain removing effective amount of the compositions of the present invention is preferably administered, applied or contacted to the surface of the teeth for a sufficient time to remove stains on tooth surfaces, in one or more conventional ways.

The frequency of the application or contact of the composition to the tooth surfaces is preferably from about once a week to about four times per day, more preferably from about 3 times per week to three times per day, even more preferably at least once per day. The period of such treatment typically ranges from about one day to a lifetime. For particular stains the duration of stain removing treatment depends on the severity of the stain being treated, the particular delivery form utilized and the warm-blooded animal's response to treatment. Preferred methods of applying the chewing gum and confectionery compositions include chewing gum that contains the composition of the present invention, and chewing or sucking on a breath tablet or lozenge or other confectionery.

The forgoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

EXAMPLE 1

Chewing Gum Composition

A chewing gum composition was prepared in accordance to the procedure set forth below using the ingredients listed in Table 1.

TABLE 1

| Ingredients | Amount (% w/w) |
|---|---|
| Gum Base | 24.00 |
| Sorbitol | 30.60 |
| Mannitol | 6.750 |
| Maltitol | 26.00 |
| Glycerine | 4.500 |
| Flavor Blend | 2.100 |
| β-Cyclodextrin/Sodium Stearate Complex | 2.50 |
| Ace-K Free | 0.053 |
| Ace-K Elastomer | 0.712 |
| APM Free | 0.210 |
| APM Elastomer | 0.741 |
| Gum Arabic | 1.213 |
| Titanium dioxide | 0.130 |
| Castor oil | 0.563 |
| Total | 100.00 |

The gum base was melted by microwave heating for about 1 to 2 minutes for each kg of gum base to yield a viscous mixture at about 110° to 120° C. The melted gum base was then added to a mixer along with the chewing gum additives including sorbitol, mannitol, maltitol, glycerin, sweeteners, gum Arabic, β-cyclodextrin/sodium stearate complex, titanium dioxide and castor oil. The mixture was mixed for about a chewing gum at a temperature from about 50° to 60° C. Thereafter, the flavor blend is added to the mixture and mixed for about 5 minutes to yield a chewing gum. The chewing gum is then shaped and cut to a desired form.

EXAMPLE 2

Hard Candy Composition

A hard candy composition was prepared in accordance to the procedure set forth below using the ingredients listed in Table 2.

TABLE 2

| Ingredients | Amount (% w/w) |
|---|---|
| Sugar (Fine Granulated) | 67.1510 |
| Corn Syrup | 31.3120 |
| Apple Juice Concentrated, 70 Brix | 0.1360 |
| FD&C Blue No. 1 | 0.0010 |

TABLE 2-continued

| Ingredients | Amount (% w/w) |
|---|---|
| Flavor | 0.4000 |
| β-Cyclodextrin/Sodium Stearate Complex | 1.0000 |
| Total | 100.00 |

The hard candy composition was prepared by heating sugar and corn syrup to a temperature of about 130° to 150° C. The β-cyclodextrin/sodium stearate complex was then added to the heated mixture at about 100° C. The remaining ingredients were then folded into the mixture and mixed thoroughly. The mixture was allowed to cool and the composition was cut and shaped into a desired form.

EXAMPLE 3

Mint Composition

A mint composition was prepared in accordance to the procedure set forth below using the ingredients listed in Table 3.

TABLE 3

| Ingredients | Amount (% w/w) |
|---|---|
| Sorbitol P60W | 92.9500 |
| Flavor | 2.00 |
| Silicon Dioxide | 0.5000 |
| β-Cyclodextrin/Sodium Stearate Complex | 4.5000 |
| Aspartame | 0.1500 |
| Magnesium stearate | 0.4000 |
| Total | 100.00 |

The mint composition was prepared by mixing sorbitol, flavor and sweetener together to yield a mint base. The remaining ingredients were then added to the mint base to yield a final mixture. The final mixture was then compressed under pressure in a suitable tableting apparatus to yield tablet forms of a desired shape and size.

EXAMPLE 4

Consumable Film Composition

A consumable film composition was prepared in accordance to the procedure set forth below using the ingredients listed in Table 4.

TABLE 4

| Ingredients | Amount (% w/w) |
|---|---|
| Deionized Water | 76.71 |
| Hydroxypropylmethyl Cellulose | 9.075 |
| Pullulan | 7.563 |
| Flavor | 5.850 |
| Polysorbate 80 | 0.350 |
| β-Cyclodextrin/Sodium Stearate Complex | 0.210 |
| Sucralose | 0.240 |
| FD&C Green #3 | 0.002 |
| Total | 100.00 |

Pullulan having a viscosity of about 5.1 mPa·s (2% aqueous solution) was added to deionized water at 23° C. The β-cyclodextrin/sodium stearate complex was then added to the pullulan mixture and stirred for about 5 minutes. Hydroxypropylmethyl cellulose was then added to the mixture and vigorously stirred for about one hour until the cellulose ingredient was completely dispersed to yield a homogenous mixture. FD&C green #3 was then added to the homogenous mixture and mixed for about 10 minutes. Polysorbate 80 was then added to the mixture and mixed for about 15 minutes. The flavor was then added and thoroughly mixed for 40 minutes to yield a slurry emulsion. The emulsion was cast on a polyethylene coated paper at 25° C. and dried at about 110° C. to form a dry thin film that can be cut to a desired size.

EXAMPLE 5

Sodium Stearate Release Study

Materials and Methods

A masticating machine described in Kleber et al., A mastication device designed for the evaluation of chewing gums, J. Dent Re. 60:109-114, 1981, was used for simulating human mastication of chewing gum. The study was implemented to measure, during chewing, the amount of sodium stearate released from chewing gums formulated with either free sodium stearate or sodium stearate complexed with β-cyclodextrin. Each sample included about 3 g of chewing gum in the form of two (2) pellets formulated with either free sodium stearate or sodium stearate complexed with β-cyclodextrin.

Each of the samples was placed in a reservoir containing 15 ml of freshly prepared modified artificial human saliva (no amino acid). The artificial human saliva was prepared according to Shellis, R. P., A synthetic saliva for cultural studies of dental plaque, Arch. Oral Biol. 23, 485-489, 1978. The chewing gum samples were each masticated through the mastication machine for about 15 minutes while in continuous contact with the artificial saliva. After 15 minutes of mastication, the artificial saliva was collected and measured for the amount of sodium stearate released. The measurement was carried out using high pressure liquid chromatography techniques.

Results

The results of the study are shown in the graph of FIG. 1. As shown in FIG. 1, the amount of sodium stearate released from chewing gum samples containing the sodium stearate/β-cyclodextrin complex, was found to be significantly higher than the amount of sodium stearate released from chewing gum samples containing free sodium stearate. Based on the results, the sodium stearate/β-cyclodextrin complex exhibited significant enhancement in the release of sodium stearate from the chewing gum during chewing.

EXAMPLE 6

Stain Removal Study

Materials and Methods

A flow system was assembled for staining samples of hydroxyapatite (HAP) disks using a staining solution. The staining solution was prepared from a mixture containing tea, coffee and porcine gastric mucin. The staining solution was circulated through the flow system at a rate of about 15 ml/min, and passed continuously over the HAP disks for about 96 hours at about 37° C. After 96 hours, the stained HAP disks were then placed in artificial human saliva (as prepared in Example 5) at a pH of about 7, and were then rinsed and allowed to dry. The HAP disks were segregated into 6 sample groups.

Each of the HAP disks was measured to yield a baseline L*a*b stain score in accordance with the Commission International de L'Eclairage Laboratory (CIELAB) color scale. The CIELAB scale quantifies color according to 3 parameters, L* (lightness-darkness scale), a* (red-green chroma), and b* (yellow-blue chroma). In order to obtain reproducible readings, the stained HAP disks were allowed to air-dry at room temperature for about 2 hours before measurement is to be made. The baseline stain measurements were taken by making diffuse reflectance absorbance readings with a Minolta spectrophotometer. The absorbance readings over the entire visible color spectrum were obtained for each HAP disk. The center of the disk segment was placed directly over the 3 mm targeting aperture of the Minolta spectrophotometer. An average of 3 absorbance readings using the L*a*b* scale were taken for each HAP disk.

Six test solutions were prepared each containing a mixture of artificial human saliva and one of the following molar ratios of sodium stearate to β-cyclodextrin: a) 0:1; b) 1:0; c) 1:0.125; d) 1:0.25; e) 1:0.5; and f) 1:1. Each sample group of stained HAP disks was treated with a corresponding test solution for comparative examination of their stain removing activity. No control test solution was used in this study. For the stain removal treatment, each sample group of the HAP disks was treated for one hour with a corresponding test solution flowing at a rate of about 15 ml/min at 37° C. After one hour of treatment, the treated HAP disks were rinsed with distilled water and allowed to air-dry for 2 hours at room temperature before making the final color readings. Each of the treated HAP disks was measured for changes in staining color using the same color measurement procedure described above. The overall change in stain level ΔE was determined for each of the treated HAP disks. The ΔE value summarizes the overall change for each color factor and indicates the stain removal capability of the respective test solution with larger ΔE values demonstrating greater stain removal.

Results

Figure 2:
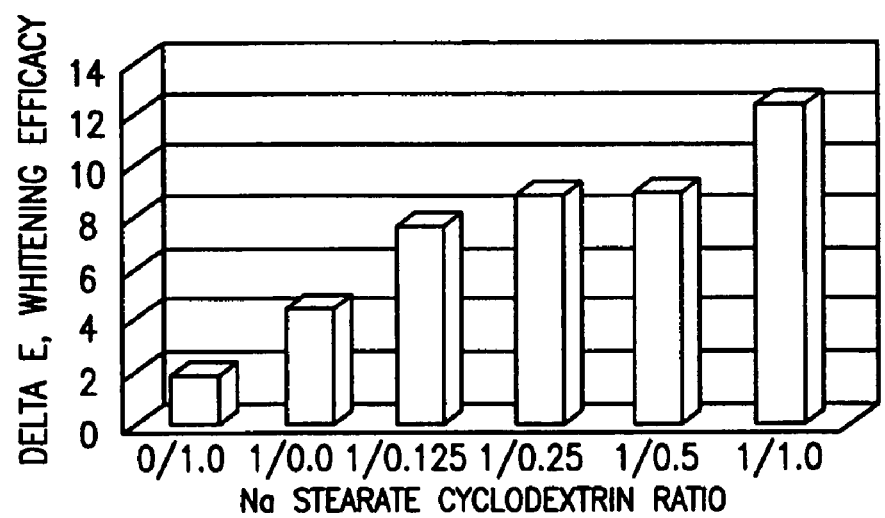
FIG. 2 is a graph showing the stain removing effect of test solutions containing sodium stearate and $\beta$-cyclodextrin in varying molar ratios on stained hydroxyapatite disks in accordance with the present invention.

The ΔE value for each test solution is shown in FIG. 2, with greater ΔE values representing greater stain removal or whitening of the HAP disks. The test solutions containing β-cyclodextrin alone or sodium stearate alone exhibited the least stain removing activity. Each of the test solutions containing the combination of sodium stearate and β-cyclodextrin exhibited significantly higher stain removing activity. The test solution containing sodium stearate and β-cyclodextrin in a 1:1 molar ratio exhibited a 3-fold increase in stain removing activity over the activity exhibited by sodium stearate alone. The data indicates that complexing sodium stearate with β-cyclodextrin significantly enhanced the whitening or stain removing efficacy of the solutions as compared to the solution that contained only sodium stearate.

It is believed that the greater stain removing activity of the 1:1 sodium stearate/β-cyclodextrin test solution is related to the ability of the complex to the penetrate the lipophilic barriers present in the artificial saliva-coated disks. It is further believed that the reduction in the ratio amount of β-cyclodextrin to sodium stearate caused a decrease in the free fraction of the sodium stearate, which lowered the amount released. Maximal absorption enhancement was obtained when sufficient β-cyclodextrin was used to solubilize the sodium stearate in the solution. Based on the results shown in FIG. 2, the complex of sodium stearate with β-cyclodextrin clearly enhances the stain removing efficacy.

What is claimed is:

1. A stain removing confectionery composition comprising a stain removing complex consisting essentially of a stain removing agent within a cavity of a cyclodextrin compound, wherein said stain removing agent is present in a manner which enables an effective amount of the stain removing agent to be released from the confectionery composition to achieve a stain removing effect on dental surfaces.

2. The stain removing confectionery composition of claim 1 wherein the cyclodextrin compound is selected from the group consisting of α-cyclodextrin, β-cyclodextrin, 'Y-cyclodextrin, derivatives thereof and combinations thereof.

3. The stain removing confectionery composition of claim 2 wherein the cyclodextrin compound is selected from the group consisting of hydroxypropyl β-cyclodextrin, hydroxyethyl β-cyclodextrin, hydroxypropyl 'Y-cyclodextrin, hydroxyethyl 'Y-cyclodextrin, methyl β-cyclodextrin and combinations thereof.

4. The stain removing confectionery composition of claim 1 wherein the molar ratio of the stain removing agent to the cyclodextrin compound is from about 1:0.1 to 1:10.

5. The stain removing confectionery composition of claim 4 wherein the molar ratio of the stain removing agent to the cyclodextrin compound is from about 1:0.5 to 1:5.

6. The stain removing confectionery composition of claim 5 wherein the molar ratio of the stain removing agent to the cyclodextrin compound is about 1:1.

7. The stain removing confectionery composition of claim 1 wherein the stain removing complex is present in an amount of from about 0.001% to 20% by weight based on the total weight of the confectionery composition.

8. The stain removing confectionery composition of claim 7 wherein the stain removing complex is present in an amount of from about 0.1% to 15% by weight based on the total weight of the confectionery composition.

9. The stain removing confectionery composition of claim 1 wherein the stain removing agent is present in an amount of from about 0.1% to 10% by weight based on the total weight of the confectionery composition.

10. The stain removing confectionery composition of claim 1 wherein the stain removing agent is selected from the group consisting of medium and long chain fatty acids, organic acids, organic peroxides, perbenzoic acids, anti-bacterial organic compounds, castor oil, sulfated butyl oleate, medium and long chain fatty acid esters, ricinoleic acid and salts, sulfated butyl oleate, medium and long chain fatty acid esters and salts thereof, sodium oleate, salts of fumaric acid, potassium glomate, organic acid esters of mono- and di-glycerides, succistearin, dioctyl sodium sulfosuccinate, glycerol tristearate, lecithin, hydroxylated lecithin, sodium lauryl sulfate, acetylated monoglycerides, succinylated monoglycerides, monoglyceride citrate, ethoxylated mono- and di-glycerides, sorbitan monostearate, calcium stearyl-2-lactylate, sodium stearyl lactylate, lactylated fatty acid esters of glycerol and propylene glycerol, glycerol-lactoesters of $C_8$-$C_{24}$ fatty acids, polyglycerol esters of $C_8$-$C_{24}$ fatty acids, propylene glycol alginate, sucrose $C_8$-$C_{24}$ fatty acid esters, diacetyl tartaric or citric or lactic acid esters of mono and diglycerides, and triacetin and combinations thereof.

11. The stain removing confectionery composition of claim 10 wherein the stain removing agent is selected from the group consisting of glycerol-lactoesters of $C_{14}$-$C_{20}$ fatty acids, polyglycerol esters of $C_{14}$-$C_{20}$ fatty acids, and sucrose $C_{14}$-$C_{20}$ fatty acid esters.

12. The stain removing confectionery composition of claim 10 wherein the stain removing agent is selected from the group consisting of sodium stearate and sodium palmitate and combinations thereof, sodium oleate, mixtures of citric acid or lactic acid esters of monoglycerides and diglycerides, glycerol stearate, glycerol laurate and combinations thereof, sucrose monostearate, sucrose distearate, sucrose monolaurate, surcrose dilaurate, polyglycerol esters of monostearate, and polyglycerol esters of monolaurate and combinations thereof.

13. The stain removing confectionery of claim 12 wherein the stain removing agent is selected from sodium stearate, sodium palmitate and combinations thereof.

14. The stain removing confectionery composition of claim 1 wherein the stain removing agent is a mixture of organic acid esters of mono- and di-glycerides.

15. A method of removing stains from teeth comprising administering to the oral cavity of a warm-blooded animal including humans an effective amount of the stain removing confectionery composition of claim 1.

* * * * *

UNITED STATES PATENT AND TRADEMARK OFFICE
CERTIFICATE OF CORRECTION

PATENT NO. : 7,641,927 B2
APPLICATION NO. : 11/602851
DATED : January 5, 2010
INVENTOR(S) : Gebreselassie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this

Sixteenth Day of November, 2010

David J. Kappos
*Director of the United States Patent and Trademark Office*